(12) United States Patent
Marr et al.

(10) Patent No.: US 8,738,478 B1
(45) Date of Patent: May 27, 2014

(54) METHODS SYSTEMS AND COMPUTER PROGRAM PRODUCTS FOR APPLYING TAX REFUND AS TAX PAYMENT

(71) Applicant: Intuit Inc., Mountain View, CA (US)

(72) Inventors: Justin C. Marr, San Diego, CA (US); Cheng-Cheng Lok, San Francisco, CA (US); Ronald J. Char, San Diego, CA (US); Robert H. Warrington, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/670,340

(22) Filed: Nov. 6, 2012

(51) Int. Cl.
*G06F 17/22* (2006.01)
*G06F 19/00* (2011.01)

(52) U.S. Cl.
USPC .......................................................... 705/31

(58) Field of Classification Search
USPC .......................................... 705/30, 31, 38, 39
See application file for complete search history.

(56) References Cited

U.S. PATENT DOCUMENTS

| | | | |
|---|---|---|---|
| 4,890,228 A * | 12/1989 | Longfield | 705/31 |
| 5,193,057 A | 3/1993 | Longfield | |
| 5,724,523 A * | 3/1998 | Longfield | 705/35 |
| 5,963,921 A * | 10/1999 | Longfield | 705/31 |
| 6,202,052 B1 | 3/2001 | Miller | |
| 6,546,373 B1 * | 4/2003 | Cerra | 705/19 |
| 6,697,787 B1 | 2/2004 | Miller | |
| 7,010,507 B1 * | 3/2006 | Anderson et al. | 705/31 |
| 7,177,829 B1 | 2/2007 | Wilson et al. | |
| 7,234,103 B1 | 6/2007 | Regan | |
| 7,249,073 B1 | 7/2007 | Lesk | |
| 7,257,553 B1 | 8/2007 | Baker | |
| 8,306,880 B1 * | 11/2012 | Fitch et al. | 705/31 |
| 8,326,711 B2 * | 12/2012 | Wilson | 705/31 |
| 8,370,228 B1 * | 2/2013 | Jacobs | 705/31 |
| 8,510,187 B1 * | 8/2013 | Dinamani et al. | 705/31 |
| 2003/0093319 A1 | 5/2003 | Jarman | |
| 2004/0054685 A1 | 3/2004 | Rahn et al. | |
| 2004/0193541 A1 | 9/2004 | Lasater et al. | |
| 2005/0203857 A1 | 9/2005 | Friedman | |
| 2007/0136160 A1 * | 6/2007 | Wilson et al. | 705/31 |
| 2007/0156581 A1 | 7/2007 | Imrey et al. | |
| 2008/0065396 A1 | 3/2008 | Marshall | |
| 2008/0082431 A1 * | 4/2008 | Bekker | 705/31 |

FOREIGN PATENT DOCUMENTS

| | | | | |
|---|---|---|---|---|
| EP | 1359523 | * | 5/2003 | G06F 17/60 |
| GB | 2460293 A | * | 2/2009 | G06Q 4/00 |

OTHER PUBLICATIONS

Securities Industry News; "Swift Global Tax Refunds"; Jun. 13, 2005; pp. 1-2.*
Francis, Brian Desher; "Dynamics of Revenue Measures in a Federal System (Tax Harmonization)"; 1995; p. 1.*

(Continued)

*Primary Examiner* — Ella Colbert
(74) *Attorney, Agent, or Firm* — Vista IP Law Group LLP

(57) ABSTRACT

Methods, systems and computer program products for paying tax owed with a refund through an intermediary when a taxpayer owes tax to one tax authority and is entitled to a refund from another tax authority. The intermediary may be an intermediate computer that electronically filed respective tax returns and may host the tax preparation application that was used to prepare the tax returns. The intermediate computer may wait to pay one tax authority until after a refund is received from a different tax authority.

24 Claims, 12 Drawing Sheets

(56) References Cited

OTHER PUBLICATIONS

VARbusiness; "Paying Out-Of-State Taxes: State Auditors Hunt Evaders"; Jan. 1990; p. 1.*
http://turbotax.intuit.com/support/iq/Direct-Deposit/Using-Direct-Deposit-for-Federal-Tax-Refunds/GEN12331.html.
http://www.irs.gov/uac/Pay-Taxes-by-Electronic-Funds-Withdrawal.
http://www.irs.gov/uac/Pay-Taxes-by-Credit-or-Debit-Card.
Notice of Allowance dated Oct. 16, 2012 in U.S. Appl. No. 11/529,167, filed Sep. 28, 2006 (11 pages).
Amendment filed Sep. 4, 2012 in U.S. Appl. No. 11/529,167, filed Sep. 28, 2006 (14 pages).
Office Action dated Jun. 4, 2012 in U.S. Appl. No. 11/529,167, filed Sep. 28, 2006 (11 pages).
Amendment filed Jun. 17, 2011 in U.S. Appl. No. 11/529,167, filed Sep. 28, 2006 (13 pages).
Amendment filed Mar. 16, 2009 in U.S. Appl. No. 11/529,167, filed Sep. 28, 2006 (19 pages).
Office Action dated Jan. 12, 2009 in U.S. Appl. No. 11/529,167, filed Sep. 28, 2006 (13 pages).
Amendment filed Sep. 12, 2008 in U.S. Appl. No. 11/529,167, filed Sep. 28, 2006 (14 pages).
Office Action dated May 12, 2008 in U.S. Appl. No. 11/529,167, filed Sep. 28, 2006 (11 pages).

* cited by examiner

FIG. 5A

*TurboTax Premier*

| Personal Info | Federal Taxes | State Taxes | Wrap-Up | Print & File |

File a Return   Print/Save for Your Records   Thank You   Check E-file Status

Selection   Federal   State   Review   Payment   Filed

You have selected our new "Pay Tax With Refund" service.

What portion of your $1076 CA Refund do you want to apply to your $1,343 Federal Tax Due?

[ $1000 ] — 533

Since you owe more federal tax than the selected CA refund portion, you still owe $343 in federal tax.

How do you want to pay the remaining $343 of federal tax due?

○ Withdraw the money from my bank account with direct debit
 - Money is withdrawn right from your account, just like paying bills online.
 - You can pick the date, as long as it's on or before April 17, 2012.

○ Charge my credit card
 - Earn points, miles or money back depending on your credit card. A convenience fee is charged for using this service.

○ I will mail a check
 - You can decide when to pay, as long as your payment is postmarked on or before April 17, 2012.

○ I want to request an installment payment plan
 - You can request an installment agreement with the IRS to make monthly payments.

Other payment options

Federal Tax Due $1,343    CA Refund $1,076

Since you did not apply your entire 2011 CA Refund to pay 2011 Federal Tax Due and 2012 estimated taxes, your remaining 2011 CA refund amount is $157.

How do you want to receive your remaining 2011 CA Refund in the amount of $157?

Direct Deposit (Recommended for a faster refund)
○ To my bank account  What if I don't have a bank account?
○ To a new TurboTax Refund Card  Learn More ○ Mail me a check

FIG. 6C

METHODS SYSTEMS AND COMPUTER PROGRAM PRODUCTS FOR APPLYING TAX REFUND AS TAX PAYMENT

SUMMARY

Embodiments are directed to inter-authority tax refund and payment processing via an intermediary on behalf of a taxpayer. Certain embodiments are generally directed to an intermediary paying a tax owed by a taxpayer with a refund to which the taxpayer is entitled via an intermediary, thus redirecting or transforming the refund into a tax payment on behalf of the taxpayer.

One embodiment is directed to a computer-implemented method comprising a computer receiving or determining an amount of tax owed by the taxpayer to a first tax authority and an amount of a refund owed to the taxpayer by a second tax authority. The method further comprises the computer executing payment of the tax owed to the first tax authority with the refund. Thus, with embodiments, the tax payment is implemented by the computer without the taxpayer ever receiving or possessing the refund, and without the taxpayer having to pay that tax payment out of pocket by direct debit, mailing a check or credit card.

A further embodiment is directed to a computer-implemented method for paying a tax owed by a taxpayer with a refund and comprises a computer receiving or determining an amount of the tax owed by the taxpayer to a first tax authority and an amount of a tax refund owed to the taxpayer by a second tax authority. The method further comprises the computer executing payment of the tax owed to the first tax authority with the tax refund before the tax refund is sent by the second tax authority to the taxpayer. Thus, the payment of the tax owed to the first tax authority can be executed without the taxpayer having to pay for that tax payment out of pocket as a result of the intermediate inter-authority refund transfer.

Another embodiment is directed to a computer-implemented method for paying a tax owed by a taxpayer and comprises a computer receiving or determining an amount of the tax owed by the taxpayer to a first tax authority and an amount of a refund owed to the taxpayer by a second tax authority, and the computer executing payment of the tax owed to the first tax authority with the tax refund without the taxpayer withdrawing funds from an account the taxpayer has at a financial institution.

Yet another embodiment is directed to a computer-implemented method for paying a tax owed by a taxpayer with a refund and comprises receiving or determining an amount of the tax owed by the taxpayer to a first tax authority and an amount of a refund owed to the taxpayer by a second tax authority, and executing payment of the tax owed to the first tax authority such that the taxpayer is never in possession of funds transferred by the computer to the first tax authority.

Yet another embodiment is directed to a computer-implemented tax payment method utilizing a refund and comprises a computer determining an amount of tax owed by the taxpayer to a first tax authority and an amount of a refund owed by a second tax authority to the taxpayer. When the amount of the tax refund is greater than the amount of tax owed, the computer executes an electronic payment to the first tax authority by applying the refund to payment of the tax owed. Any remaining refund is electronically deposited into a designated account of the taxpayer at a financial institution or paid to the taxpayer in another form such as a check, refund card or gift card. When the amount of the refund is less than the amount of tax owed, the computer executes an electronic payment to the first tax authority by applying the refund to the tax owed. The computer can also execute an electronic payment or withdraw of the remaining tax due from a designated account of the taxpayer at a financial institution. If no electronic payment or withdraw is executed, payment is received by the first tax authority by the taxpayer paying the remaining tax owed by other payment methods such as direct debit, mailing a check, or payment by credit card.

Yet other embodiments are directed to computer-implemented methods performed by a computer of a tax authority. For example, when the taxpayer owes tax to a first tax authority, but is entitled to receive a refund from a second tax authority, method embodiments may involve actions performed by the first tax authority computer receiving funds through an intermediate computer from the second tax authority such that the payment received from the intermediate computer includes funds that would have otherwise been sent to the taxpayer as a refund by the second tax authority. As another example, method embodiments may involve actions performed by the second tax authority computer making an electronic transfer of a refund to an intermediate computer to be used as payment to the first tax authority. Thus, rather than sending the refund to the taxpayer, the second tax authority computer transmits or wires refund funds to the intermediate computer instead.

Further embodiments are directed to interactive methods involving different tax authorities or computers thereof, interactive methods involving different tax authorities or computers thereof and an intermediate host or computer thereof, e.g., that hosts a tax preparation application. Yet other embodiments are directed to interactive methods involving an intermediate host or computer thereof, e.g., that hosts a tax preparation program, and an end user or taxpayer or computing device thereof. Thus, interactive methods may involve two or more or all of computers of an end user or tax payer, an intermediate host, and one or multiple tax authorities.

Additional embodiments are directed to articles of manufacture or computer program products comprising a non-transitory computer readable storage medium embodying one or more instructions executable by a computing device to perform method embodiments involving transforming a refund from one tax authority into payment of a tax due to another tax authority. Such computer program products may execute on or by the taxpayer's computing device, an intermediate computing device (such as a host of a tax preparation program utilized to prepare and file electronic tax returns) and/or computing devices of tax authorities. Embodiments may also be modules or components of a tax preparation program. Embodiments may also be in the form of an application executable on a mobile computing or communication device such as a smartphone or tablet computing device.

Further embodiments are directed to systems configured for applying a refund from one tax authority to payment of tax owed to another tax authority. System embodiments may comprise or involve only computers of tax authorities (for direct transfer of refund funds from one tax authority to another). As another example, system embodiments may also comprise or involve an intermediate computer (such as a host of a tax preparation application) and/or a computer of a financial institution associated with the host).

Other embodiments are directed to user interfaces generated by an application or program executing on a computing device of the customer or merchant such as a tax preparation program operable to prepare and file electronic tax returns, and that provide the user or taxpayer with the option of having an intermediary apply a refund from one tax authority to pay tax owed to another tax authority (as distinguished from payment from a taxpayer checking or credit card account).

User interfaces may also allow the user or taxpayer to designate how any remaining refund should be paid to the taxpayer, e.g., as an electronic deposit to a designated checking or other account of the taxpayer, as a check or other card that has been credited with the remaining refund amount. User interfaces may also allow the user or taxpayer to designate how any remaining tax to be paid after the refund has been applied is to be paid, e.g., by electronic withdraw from a designated checking or other account of the taxpayer, by credit card, or by check.

In a single or multiple embodiments, the tax paid, such as income tax, to the first tax authority on behalf of the taxpayer is executed without the taxpayer having to pay the tax out of pocket. For example, the taxpayer does not have to deposit the tax refund into an account of the taxpayer at a financial institution and then take other action, such as drawing upon an account the taxpayer has at a financial institution by writing a check, making an electronic payment from the checking account or paying be credit card.

In a single or multiple embodiments, one tax authority is a federal tax authority and the other tax authority is a state tax authority. In other embodiments, at least one tax authority is a local tax authority.

In a single or multiple embodiments, the computer of the first tax authority receives or determines the refund and tax amounts and receives funds of the tax refund from the second tax authority computer for electronic payment of the tax owed to the first tax authority (e.g., by withdrawing funds from the second tax authority, or by receiving an electronic payment from the second tax authority).

In a single or multiple embodiments, the computer executing an inter-authority transfer is an intermediate computer in communication with a computer of the first tax authority and a computer of the second tax authority through respective networks. The intermediate computer receives funds of the tax refund from the second tax authority and executes payment of tax owed to the first tax authority with the tax refund funds, e.g., after confirming receipt of refund funds from the second tax authority. According to certain embodiments, the intermediate computer is managed by a host of a tax preparation program operable to prepare and file electronic tax returns with the tax authorities. In other embodiments, the intermediate computer is a computer of a financial institution of the host or associated for the host for communications involving multiple tax authorities to apply refunds to tax payments. Thus, the intermediate computer is not a computer of a financial institution at which the taxpayer has a checking, credit card or other account and is not a financial institution computer that the taxpayer has access to for such checking and other banking services.

In a single or multiple embodiments, the tax preparation application presents the taxpayer with an option to pay the tax owed to one tax authority with a refund to which the taxpayer is entitled from another tax authority. The taxpayer may also select a percentage or amount of the refund from one tax authority to be applied to payment of tax owed to another tax authority.

In a single or multiple embodiments, the refund is used to pay all of the tax owed to the first tax authority. Any remaining refund can be sent to the taxpayer, e.g., via electronic deposit, check or refund card. In other embodiments, the amount of tax owed is greater than the refund amount. The refund can be applied to a first portion of the tax owed, and the taxpayer pays the remaining portion through another channel or payment method such as writing a check, electronic withdraw from a checking account or by credit card.

Thus, method embodiments provide computer-implemented tax payment methods that do not require out-of-pocket payment by the taxpayer (in cases in which the refund is greater than the tax owed), or reduce the amount of out-of-pocket money required for a tax payment (in cases in which the tax owed is greater than the refund). In addition to providing for more convenient tax payments, embodiments can also provide for tax payments without the taxpayer sending a check, making an electronic payment or using a credit card to pay tax owed, and allows taxpayers to pay taxes owed even if the taxpayer does not have a checking account or credit card, and when the taxpayer has insufficient funds or credit to pay tax owed. This is also beneficial since reducing credit card payments, for example, may also save the taxpayer interest over time.

BRIEF DESCRIPTION OF THE DRAWINGS

The foregoing and other aspects of embodiments are described in further detail with reference to the accompanying drawings, wherein:

FIGS. 5A-D are examples of screen shots of interview screens generated by a tax preparation application according to embodiments, the interview screens being navigated by a taxpayer and allowing the taxpayer to select how a refund from one tax authority should be applied as payment of tax owed by another tax authority and how any remaining refund or tax payment should be processed;

FIGS. 6A-C are examples of screen shots of interview screens generated by a tax preparation application according to embodiments, the interview screens being navigated by a taxpayer and allowing the taxpayer to select how a refund from one tax authority should be applied as payment of tax owed by another tax authority, estimated taxes, and how any remaining refund or tax payment should be processed.

DETAILED DESCRIPTION OF ILLUSTRATED EMBODIMENTS

Embodiments relate to applying tax refunds to tax payments such that a tax refund to which a taxpayer is otherwise entitled from one tax authority is instead processed by an intermediary to pay tax owed by the taxpayer to another tax authority. Thus, embodiments transform refunds that are normally sent by a tax authority to a refund recipient, into a tax payment to another tax authority on behalf of the taxpayer so that the taxpayer does not have to pay for that tax payment out of pocket.

Figure 1:
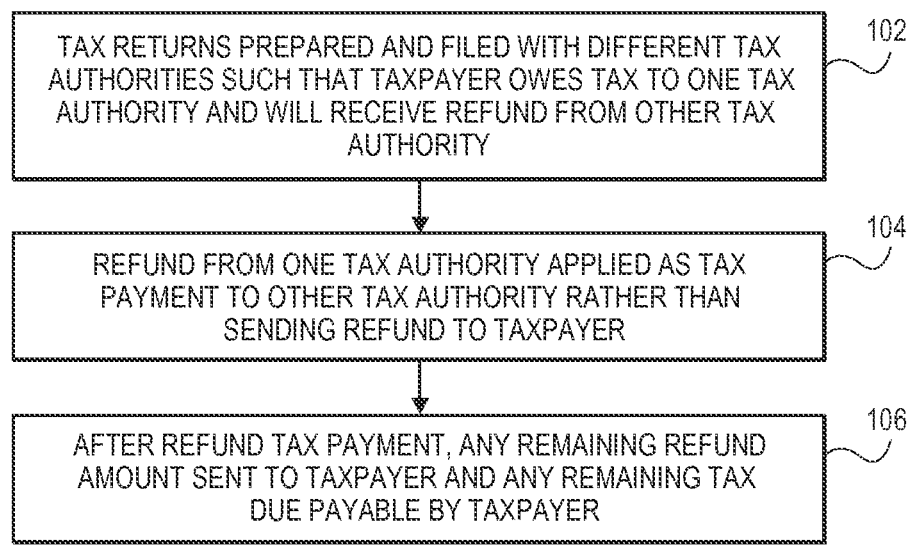
FIG. 1 is a flow diagram of an embodiment of a method of applying a refund from one tax authority as a tax payment to a different tax authority.

Referring to FIG. 1, at 102, a user such as a taxpayer, accountant or tax professional, prepares electronic tax returns, which are filed with different tax authorities. For example, a tax return may be filed with a federal tax authority such as the Internal Revenue Service (IRS), and a tax return may be filed with a state tax authority such as Franchise Tax Board of the State of California. Based on the filed tax returns, the taxpayer may owe one tax authority, such as the IRS, but will be receiving a refund from another tax authority, such as a state tax authority.

With embodiments, at 104, the refund is processed by an intermediary, which executes an inter-authority transfer via the intermediary for payment of tax owed to the IRS, without sending to the taxpayer those refund funds utilized for the tax payment. In this manner, the taxpayer is not required pay out-of-pocket by writing a check or paying tax by direct debit or credit card. Accordingly, embodiments are different than tax refund methods in which a tax authority simply mails a check in the amount of the refund to the taxpayer or electronically deposits the entire refund amount to a designated account, and different than tax payment methods in which the taxpayer makes a tax payment by writing and mailing a check, direct debit or payment by credit card.

At 106, any refund remaining after intermediary processing may then be sent to the taxpayer, but the refund amount received by the taxpayer is less than the refund amount in the electronic tax return. Similarly, any remaining tax due to the first tax authority after intermediary processing may be sent to the first authority by the taxpayer, e.g., by direct debit, check or credit card, but the remaining tax due is less than the total tax due in the electronic tax return. Further embodiments and aspects of embodiments are described in further detail with reference to FIGS. 2-7.

Figure 2:
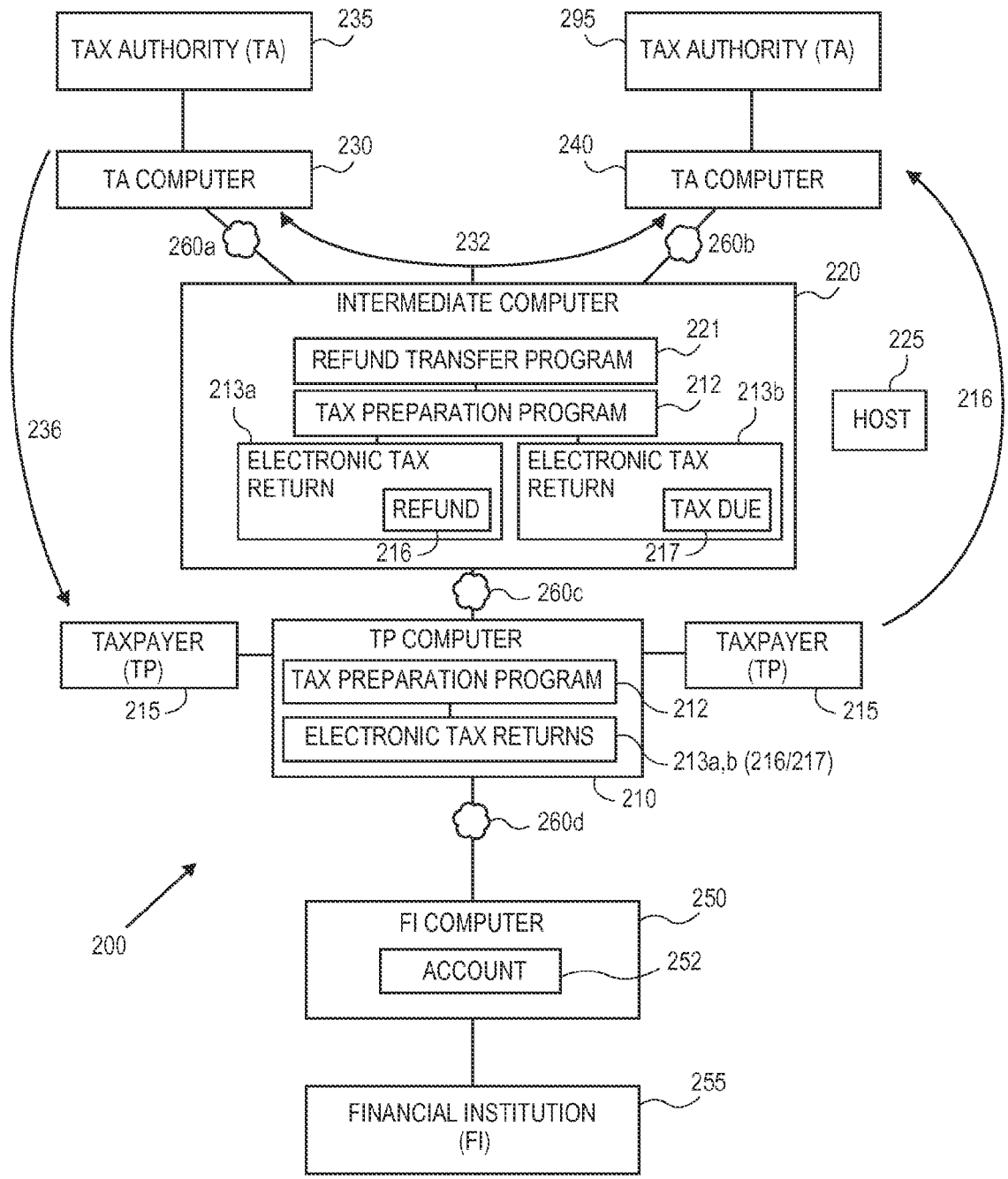
FIG. 2 is a block diagram of one embodiment of a system configured or operable for inter-authority refund transfer for payment of tax owed by a taxpayer without the taxpayer making an out-of-pocket payment for that tax payment.

Referring to FIG. 2, a system 200 configured according to one embodiment is operable to execute inter-authority refund tax payments via an intermediary by executing payment of tax due or owed by a taxpayer to one tax authority with a refund owed to the taxpayer by another tax authority via the intermediary.

One embodiment of a system 200 includes or involves a computing device 210 of a user or taxpayer 215 ("TP" for taxpayer in FIG. 2), an intermediate computer 220 of an intermediary or host 225 (generally, intermediary 225), a computer 230 of a first tax authority 235 and a computer 240 of a second tax authority 245, which is different than the first tax authority 235.

A "different" tax authority may be a different type of tax authority, or a tax authority of the same type but of a different state or jurisdiction. Examples of tax authorities 235, 245 include a federal tax authority such as the Internal Revenue Service (IRS), a state tax authority such as the Franchise Tax Board of the State of California, local tax authorities, and other tax collecting entities. Thus, one example involving "different" tax authorities involves the IRS and a state tax authority, and another example of "different" tax authorities involves tax authority of the State of California and a tax authority of the State of New York. For ease of explanation, reference is made generally to a tax authority, and particular examples of how embodiments may be implemented refer to the IRS 245 and State of California tax authority 235, and using a refund from a first tax authority 235 to pay tax due to a second tax authority 245. It will be understood that embodiments may involve other tax authorities and other numbers of tax authorities.

The user or taxpayer 215 executes a tax preparation program 212 executing on the taxpayer's computer 210 or executes a browser to access an on-line version of the tax preparation program 212 to prepare and/or file electronic tax returns 213a-b (generally, tax return 213). The tax returns 213a-b generate results indicating respective refund 216 and tax due 217. While the "taxpayer" 215 owes tax to one tax authority 245, and is also entitled to a refund from another tax authority 235, reference is made to "taxpayer" 215 for ease of explanation.

One example of the intermediary 225 that provides tax preparation programs 212 operable to prepare and/or file electronic tax returns 213 is Intuit Inc., of Mountain View, Calif. The user of the tax preparation program 212 may be the taxpayer 215 or a person preparing tax returns 213 for the taxpayer 215 such as an accountant or tax professional, but it is the refund 216 and tax due 217 of the taxpayer's tax returns 213 that are processed according to embodiments. The taxpayer 215 may be an individual taxpayer and other taxpayers including corporate taxpayers or other entities for whom or for which tax returns are 213 are prepared.

The taxpayer's computing device 210 may be a computer, including desktop and laptop computers, smartphone or tablet computing device or other suitable computing or communication device. Tax preparation programs 212 may be utilized to prepare individual or corporate or business tax returns, and may involve preparation of federal and one or more state or other tax authority returns. For ease of explanation, reference is made to taxpayer 215, taxpayer computer 210, and tax returns 213a,b involving a refund 216 and tax due 217 for different tax authorities 235, 245.

The intermediate computer 220 is operable to electronically file tax returns 213a,b and according to embodiments, by execution of a refund transfer program 221 in communication with the tax preparation program 212, to execute inter-authority refund transfers or refund tax payments 232 via the intermediary 225 to pay tax 217 owed by the taxpayer 215 to one tax authority 235 using the refund 216 to which the taxpayer 215 is entitled from another tax authority 245. For this purpose, the host 225 is authorized by the tax authorities 235, 245 to execute refund transfer program 221 to communicate with tax authorities 235, 245, receive or retrieve funds of a refund 216, initiate inter-authority fund transfers 232 on behalf of the taxpayer 215 to pay tax due 217, and authorized by the taxpayer based at least in part upon taxpayer 215 input received through the tax preparation program 212. For this purpose, the host 225 is also compliance with applicable banking and money transfer laws.

While FIG. 2 shows the refund transfer program 221 as separate from the tax preparation program 212, in other embodiments, the refund transfer program 221 may be a module or component of the tax preparation program 212. Further, as generally illustrated in FIG. 2, the refund transfer program 221 may only be accessible or executable by the intermediate computer 220 such that the taxpayer 215 can access the tax preparation program 212 and authorize refund transfer according to embodiments, but does not control the refund transfer program 221.

Figure 3:
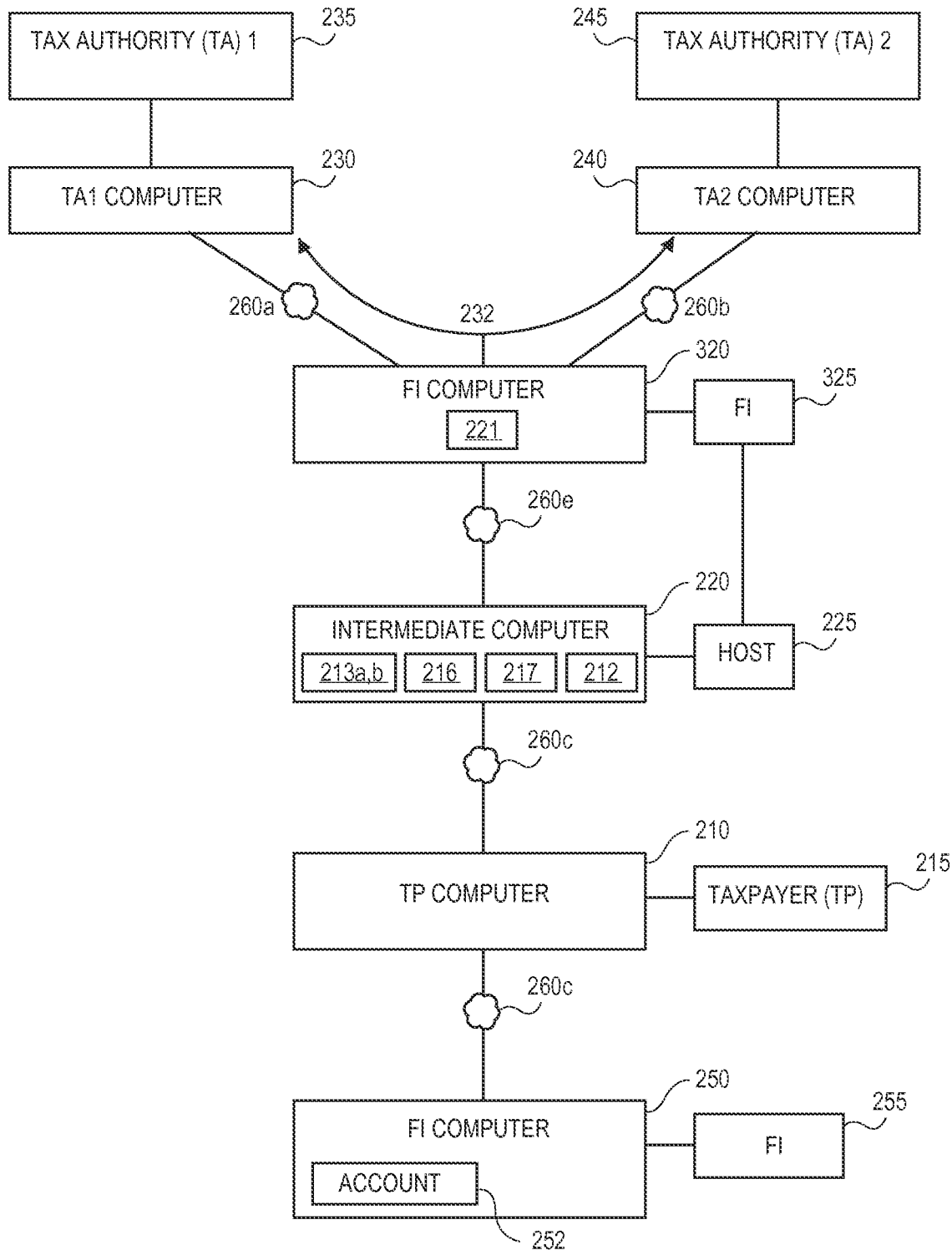
FIG. 3 is a block diagram of one embodiment of a system configured or operable for inter-authority refund transfer for payment of tax owed by a taxpayer without the taxpayer making an out-of-pocket payment for that tax payment in which the inter-authority transfer is executed by a financial institution computer of or associated with an intermediate computer host.

Referring to FIG. 3, in another system configuration, the intermediary 225, such as Intuit Inc., is associated with a computer 320 of a financial institution (FI) 325, and as a FI 325, complies with applicable banking and money transfer laws and regulations. Thus, in the illustrated system configuration, the FI computer 320 is an intermediate computer in communication with respective computers 230, 240 of respective tax authorities 235, 245 for executing inter-authority transfers 232 of a refund for a tax payment. The refund transfer program 221 may execute on the intermediate computer 220 and direct how the intermediate FI computer 320 should transfer 232 the refund 216 as a tax payment to pay tax due 217 to another tax authority 245. The refund transfer program 221 may also execute one or both of the intermediate computer 210 and intermediate FI computer 320 and be in communication with the tax preparation program 212 for implementing embodiments. For ease of explanation, reference is made to the system configuration shown in FIG. 3, in which the intermediary's intermediate computer 220, e.g., via the refund transfer program 221, controls how the intermediate FI computer 320 communicates with tax authorities 235, 245 for the specific purpose of implementing inter-authority fund transfers 232 via the intermediate computer 220 and/or intermediate FI computer 320.

FIG. 3 also shows the intermediate computer 220 in communication with a computer 250 of a different FI 255 at which the taxpayer 215 has an account 252, such as a savings, checking or credit card account. The taxpayer 215 can access the account 252 and FI computer 250, whereas the taxpayer 215 does not have access to or does not execute the intermediate FI computer 320 or refund transfer program 221. The taxpayer's FI computer 250 is not involved in executing an inter-authority transfer 232 of a refund 216 as a tax payment to pay tax due 217 to a tax authority 245 according to embodiments.

Communications between various system components shown in FIGS. 2-3 may be implemented through one or more networks 260a-e (generally, network 260). Example network 260 that may be utilized for communications between system components may wired and wireless or cellular networks, and include, but are not limited to, a Local Area Network (LAN), a Wide Area Network (WAN), Metropolitan Area Network (MAN), a Wi-Fi network, and other suitable networks capable of transmitting data, and a combination one or more or networks. For ease of explanation, reference is made generally to a network 260, but embodiments may involve various networks, combinations thereof, and respective communications systems, and protocols. Further network 260 and protocols may involve security protocols for communications with tax authorities and financial institutions.

Figure 4:
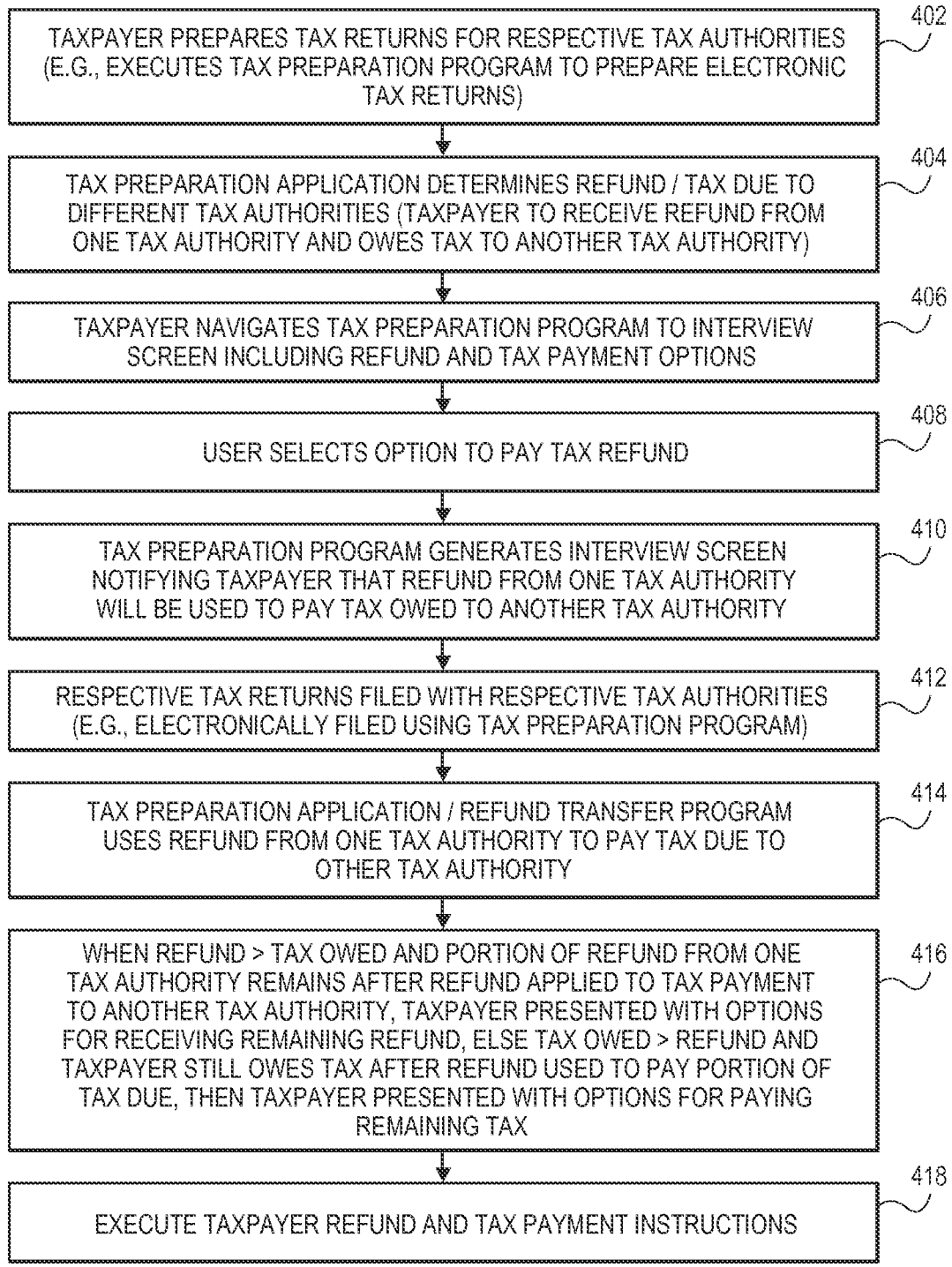
FIG. 4 is a flow diagram of an embodiment of a method of applying a refund from one tax authority as a tax payment to a different tax authority.

Referring to FIG. 4, and with continuing reference to FIGS. 2-3, a method that may be implemented by the tax preparation program 212, or by the refund transfer program 221 of or in communication with the tax preparation program 212, for paying tax owed 217 to one tax authority 245 with a refund 216 from another tax authority 235 comprises, at 402, electronic tax returns 213a,b for different tax authorities 235, 245 being prepared by the tax preparation program 212.

Step 402 involves the taxpayer 215 or other user executing the tax preparation program 212 and manually entering or importing tax return data to prepare tax returns 213a,b for respective tax authorities 235, 245. For example, a tax preparation program 212 available from Intuit Inc. prepares individual electronic tax returns for a federal tax authority 245 and a state tax authority 235. One tax return 213a indicates an amount of a refund 216, and another tax return 213b indicates an amount of tax due 217.

The intermediate computer 220 may serve as, or be in communication with, an electronic filing system or server that functions as a "clearing house" for formatting and transmitting completed electronic tax returns 213a,b to respective tax authority computers 230, 240. The intermediate computer 220 may also process acknowledgements and other data received from tax authority computers 230, 240 and to route related information back to the user computer 210. One example of intermediate or electronic filing server 220 that may be utilized in embodiments is a server of Intuit Inc., e.g., a server of the Intuit Electronic Filing Center.

For ease of explanation, reference is made to a tax preparation program 212 that is utilized to prepare and file a federal electronic tax return 213a with a federal tax authority 235 (such as the IRS) and a state electronic tax return 213b with a state tax authority 245 (such as the Franchise Tax Board of the State of California). However, it will be understood that embodiments may involve various taxpayers 215, and that the tax preparation program 212 may be used to prepare and file electronic tax returns 213, or to prepare, print and mail tax returns 213.

Referring again to FIG. 4, at 404, the tax preparation program 212 accesses electronic tax return 213 data to determine the taxpayer's refund 216 from one tax authority 235 and the tax due 217 to another tax authority 245. For this purpose, the tax preparation program 212 accesses an electronic tax return, or receives or determines refund 216 and tax due 217 from data provided by the taxpayer 215 or scanning paper or mailed copies of tax returns 213 and applying a recognition process such as Optical Character Recognition (OCR) as necessary.

Continuing with reference to FIG. 4, at 406, based on the tax due 217 to one tax authority 245 and the taxpayer 215 being entitled to a refund 216 from another tax authority 216, the tax preparation program 212 presents interview screens that are navigated by the taxpayer 215 to present refund 216 and tax due 217 payment options to the taxpayer 215 according to embodiments.

Figure 5A:
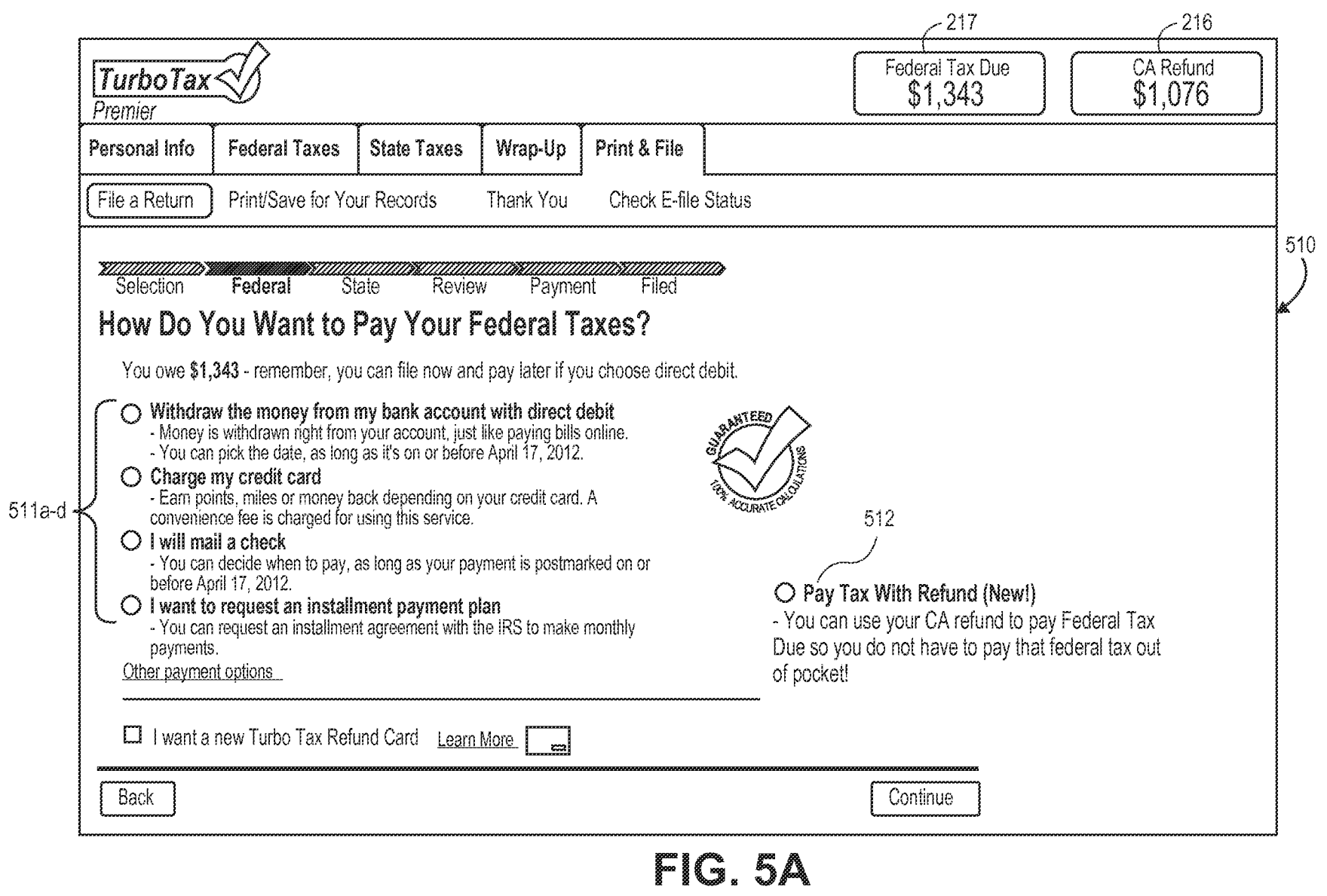

For example, referring to FIG. 5A, the tax preparation program 212 generates an interview screen 510 with options for paying tax due 217 to one tax authority 245, which in the illustrated example, is a federal tax authority such as the IRS. In the illustrated example, the tax due 217 to the IRS is in the amount of $1,343 ("Federal Tax Due"), and the refund 216 (CA Refund) from the State of California is in the amount of $1,076. The interview screen 510 includes payment options 511a-d (generally, payment option 511) that the taxpayer 215 can select to pay the tax due 217, e.g., by direct debit, credit card, writing a check, or an installment plan. According to embodiments, the interview screen 510 also includes another option "Pay Tax With Refund (New!) 512 and explains, based on the example provided, that the taxpayer 215 can use the CA refund 216 to pay the federal tax due 217 so that the taxpayer 215 does not have to pay that federal tax due 217 out of pocket.

Figure 5B:

Referring again to FIG. 4 and with continuing reference to FIGS. 5A-B, at 408, the tax preparation application 212 receives electronic data or input indicating taxpayer 215 has selected the "Pay Tax With Refund" option 512 of embodiments, and at 410, generates one or more interview screens with instructions or notifications regarding the selected option 512 of paying tax due 217 to the IRS 245 with the refund 216 from the State of California 235.

For example, FIG. 5B illustrates an interview screen 520 confirming that the "Pay Tax With Refund" option 512 has been selected, and notifying 522 the taxpayer 215 that the taxpayer 215 will not receive the refund 216 (in contrast to traditional refund methods) since the refund 216 will instead be transformed into a tax payment or applied to pay the federal tax due 217.

In the example illustrated in FIG. 5B, the CA refund 216 in the amount of $1,076 is less than the federal tax due 217 in the amount of $1,343. Thus, the interview screen 520 includes an explanation 523 that after the CA refund 216 is applied to federal tax due 217, the taxpayer 215 still owes the IRS $267. The interview screen 520 then presents the taxpayer 215 with other options 511a-d for paying the remaining tax due, e.g., by direct debit from an account the taxpayer has at a FI, payment by credit card, mailing a check, or installment payment.

Referring to FIG. 5C, as another example of how embodiments can be implemented, the interview screen 530 presents the taxpayer 215 with the option 532 of specifying a portion of the CA refund 216 to be used for payment of Federal Tax Due 217. In the illustrated example, the CA refund 216 as determined by the tax preparation program 212 is in the amount of $1,343, and the taxpayer 215 has entered in field 533 that $1,000 of the CA refund 216 should be used for payment of tax due 217 to the IRS 245. Thus, embodiments may involve allocation of the entire CA refund 216 (as shown in FIG. 5B), or a selected portion or percentage of the CA refund 216 (as shown in FIG. 5C).

As further illustrated in the embodiment shown in FIG. 5C, the tax due 217 to the IRS 245 is greater than the CA refund 216 to be applied as payment of federal tax due 217 such that the interview screen 530 presents a message or notification 533 that the taxpayer 215 still owes the IRS $343 assuming the selected portion of the CA refund 216 is applied to the federal tax due 217. As such, the interview screen 530 presents other payment options 511a-d for paying the remaining $343 tax due including direct debit, credit card, check and installment plan as discussed above.

Figure 5D:
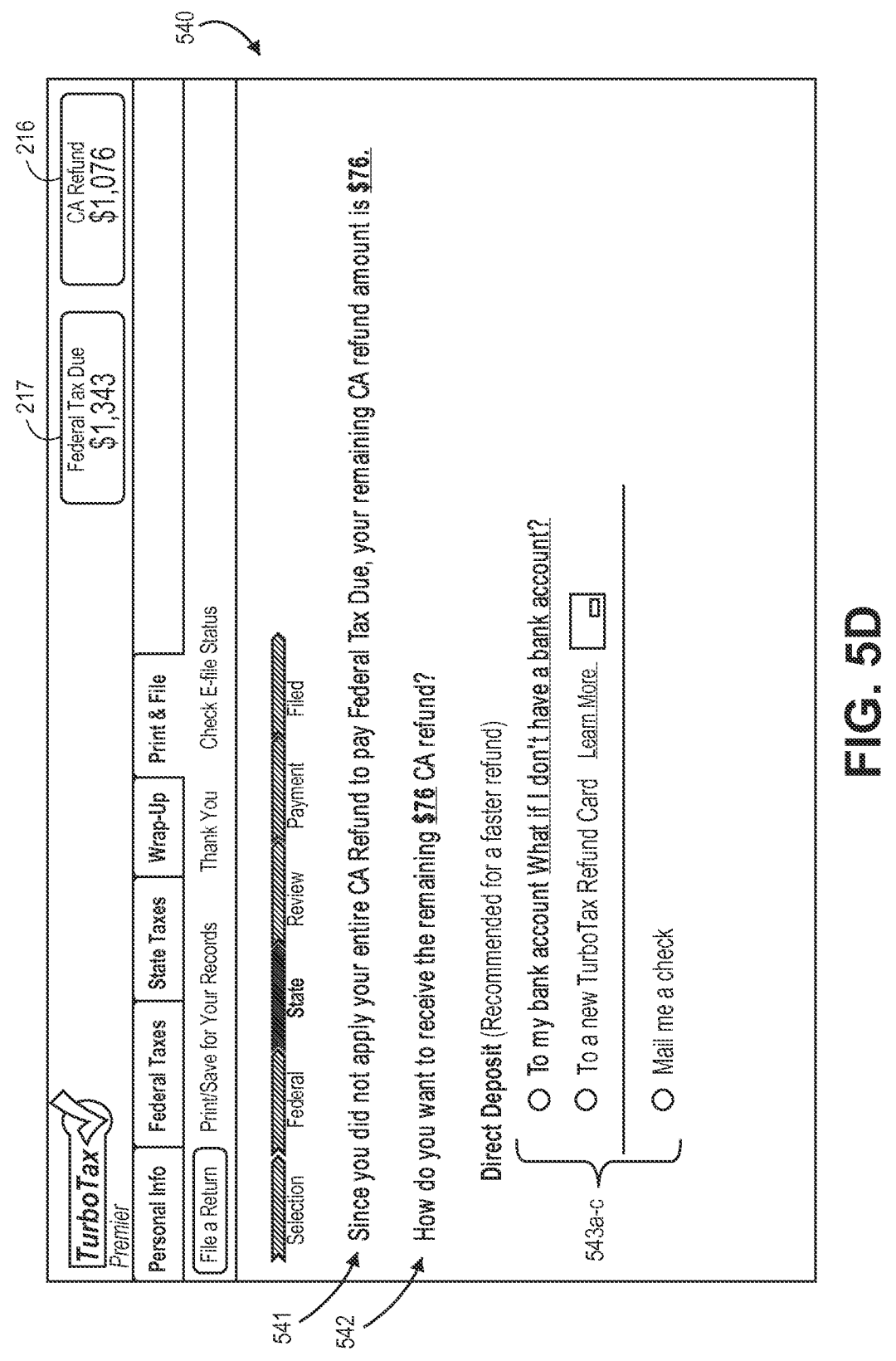

With further reference to FIG. 5D, and continuing with the example of FIGS. 5A-C, since the total amount of the CA refund 216 is greater than the amount of the CA refund 216 allocated to federal tax due 217, an interview screen 540 notifies 541 the taxpayer 215 that the taxpayer 215 has a remaining CA refund 216 in the amount of $76, and presents a question 542 asking the taxpayer 215 how the taxpayer wants to receive the remaining CA refund. The interview screen 540 presents refund options 543a-c for sending the remaining CA refund 216 to the taxpayer 215, e.g., by direct deposit to an account or refund card, or mailing a check.

Referring again to FIG. 4, at 412, the intermediate computer 220 serves as a "clearing house" that formats and checks the electronic tax returns 213a,b as necessary, and electronically files the formatted tax returns 213a,b with respective tax authority computers 230, 240. While certain steps involving specifying how refunds 216 and tax due 217 instructions are processed before tax returns 213 are filed, various steps in FIG. 4 may also be performed after tax returns are filed, e.g., after the tax authorities 235, 245 have confirmed the refund 216 and tax due amounts 217, but before the tax authority 235 has sent the refund 216 to the taxpayer 215, e.g., after confirmations or acknowledgments are received by the intermediate computer 220.

Referring again to FIG. 4, at 414, after receiving filing acknowledgements and confirmation of the refund amount 216 and federal tax due 217 from respective tax authority computers 230, 240 as necessary, the refund transfer program 221 (of the intermediate computer 220 or intermediate FI computer 230), per instructions of the taxpayer 215 provided through the interview screens of the tax preparation program 212, executes instructions for inter-authority transfer 232 of the refund 216 from one tax authority 235 to another tax authority 245 by withdrawing or receiving the refund 216 and applying the refund 216 as a tax payment to tax due 217 to the other tax authority 245. According to one embodiment, the intermediate computer 220 (or intermediate FI computer 320 as shown in FIG. 3) executes the inter-authority refund transfer 232 for payment of tax due 217 only after confirming receipt of refund 216 funds from the refunding tax authority 235.

At 416, following execution of the refund transfer payment 232 (and payment of any service fees to the host 215 as applicable), the tax preparation program 212 determines whether there is any remaining portion of the refund 216 to which the taxpayer 215 is entitled, or if the taxpayer 215 still owes a portion of the tax due 217.

Continuing with the above example, at 418, and with further reference to FIGS. 2-3, when the CA Refund 216 applied 232 as a tax payment to pay Federal Tax Due 217 is greater than Federal Tax Due 217, then a portion of the total CA Refund 216 amount remains after refund tax payment processing 232. Any remaining CA refund 216 is sent or transmitted 236 to the taxpayer 215 per the instructions the taxpayer 215 provided in the interview screen, e.g., by direct deposit to the taxpayer's account 252 of the taxpayer's FI 250, sent by mail, or as a refund card, as described with reference to FIG. 5D. When the CA Refund 216 applied as a tax payment to pay Federal Tax Due 217 is less than Federal Tax Due 217, then the taxpayer 215 still owes the IRS 245 a portion of the total Federal Tax Due 217, and the remaining tax is paid or transmitted 246 by the taxpayer 215 per the taxpayer instructions specified in the interview screen, e.g., by direct debit, check or credit card, as discussed above with reference to FIG. 5C.

Certain embodiments discussed above involve the intermediate computer 220 processing payment of tax due 217 to a federal tax authority 245 using a state tax authority refund 216. Other embodiments involve the intermediate computer 220 processing payment of tax due 217 to a state tax authority 235 using a federal tax authority refund 216, and the same or similar method steps are performed but involving different tax authorities, and thus are not repeated.

Moreover, while certain embodiments are described with reference to two tax authorities 235, 245 (one federal tax authority, and one state tax authority), embodiments may involve three or more tax authorities, and one or multiple federal tax authorities, and one or multiple state tax authorities. Yet other embodiments involve local tax authorities. Thus, it will be understood that embodiments may be applied to various types, numbers and combinations of electronic tax returns 213 to apply a refund 216 from one or more tax authorities as payment of tax due 217 to one or more other tax authorities via an intermediary 225, 235 executing the refund transfer program 221 for one or multiple inter-authority transfers 232.

Further, given the manner in which embodiments execute instructions to apply the refund 216 from one tax authority 235 as payment of tax due 217 to another tax authority 245, embodiments allow tax payments to be made without the taxpayer 215 having to pay that tax amount out of pocket. After execution of an inter-authority refund transfer 232 according to embodiments, the taxpayer 215 may still have to pay remaining tax due 217 using direct debit, check or credit card, but the portion of the tax due 217 processed according to embodiments does not need to be paid out of pocket by the taxpayer 215. Moreover, while the taxpayer 215 may provide instructions for using a refund 216 to pay tax due 217 according to embodiments, the taxpayer 215 never actually receives the refund 216 from the first tax authority 235 since the refund 216 is instead managed at a different level by the intermediate computer 220 or intermediate FI computer 320 in communication with and between different tax authority computers 230, 240 for inter-authority transfer 232.

Thus, in embodiments, the intermediate computer 220 or intermediate FI computer executes the refund transfer program 221 for payment of the tax due 217 to one tax authority 245 with the tax refund 216 from another tax authority 235 without sending those refund funds 216 to the taxpayer 215. Moreover, with embodiments, the taxpayer 215 never actually receives or possesses that refund portion 216 processed by the refund transfer program 221 as a tax payment. Thus, embodiments provide for payment of tax due 217 on behalf of the taxpayer 215 without the taxpayer 215 withdrawing funds from an account 252 the taxpayer has at the taxpayer's FI 250.

While embodiments have been described with reference to inter-authority transfers 232 for applying a refund 216 as payment for tax due 217, it will be understood that embodiments may be applied to current year refunds and taxes, estimated taxes and a combination thereof.

For example, in one embodiment, a tax refund 216 to which the taxpayer 215 is entitled from one tax authority 235 is used to pay estimated tax 217e ("e" referring to "estimated") to another tax authority 245. Thus, an electronic tax return 213 for a first or current tax year for a first tax authority 245 such as the IRS may indicate a refund 216 in the amount of $1,000 payable to the taxpayer 215, and with embodiments, the refund 216 for a first or current tax year (such as 2011) is utilized for payment of estimated tax 217e for a second or future current tax year (such as 2012) owed to a different tax authority 235, such as a state tax authority. This can be done without sending refund funds 216 utilized for the estimated tax payment 217e to the taxpayer 215, and without the taxpayer 215 having to write a check or make an electronic payment for that estimated tax payment 217e.

Figure 6A:
Figure 6B:
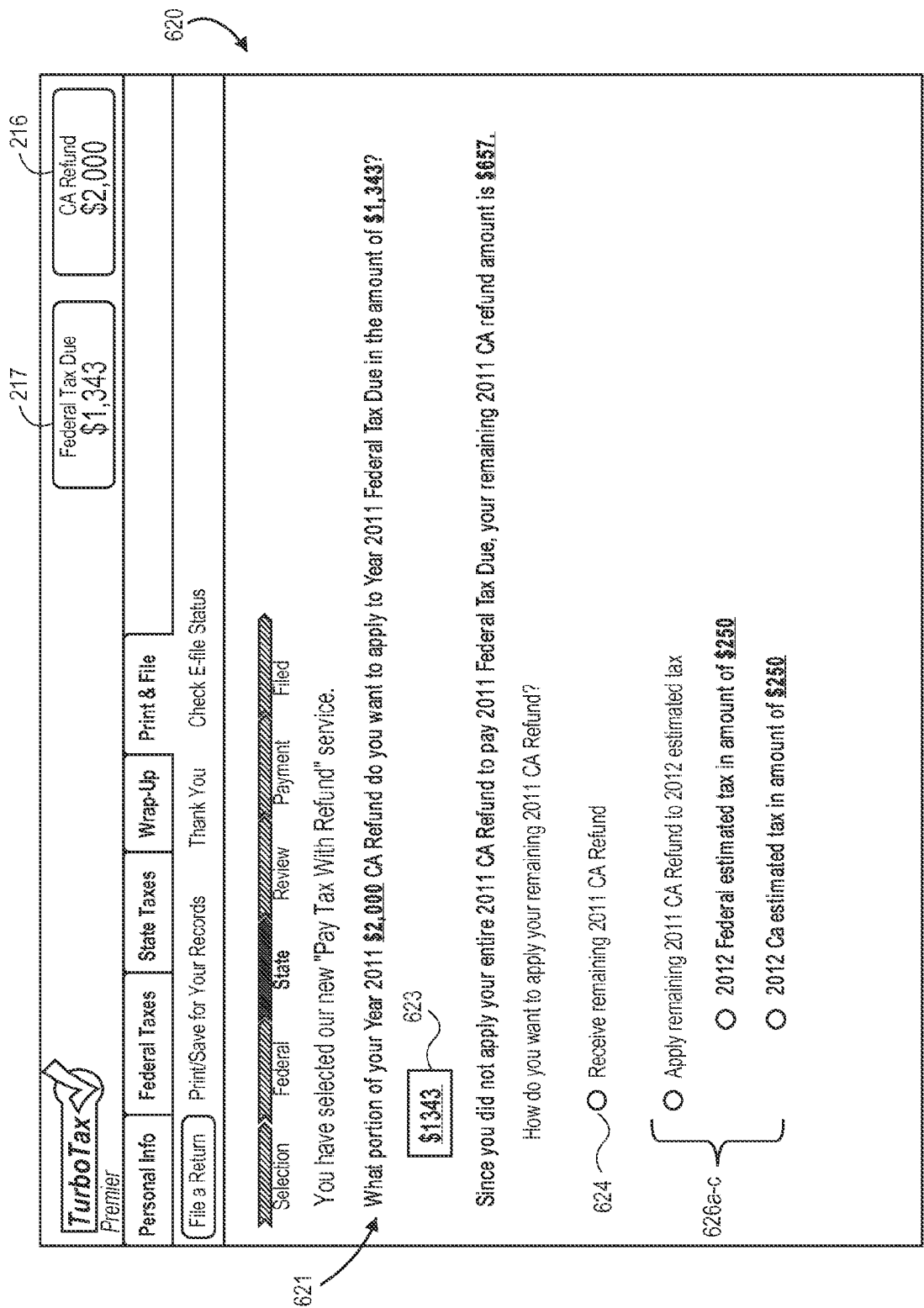

FIGS. 6A-C illustrate examples of how embodiments may be applied to use a current year refund 216 for current year tax 217 and/or future year estimated tax 217e. Referring to FIG. 6A, the taxpayer 215 owes tax due 217 ("Federal Tax Due") in the amount of $1,343 to the IRS 245 for a first or current year, and is entitled to a refund 216 (CA Refund) from the State of California 235 in the amount of $2,000 for the first or current year. The tax preparation program 212 generates an interview screen 610 that presenting options 511a-d for how the taxpayer 215 can pay tax due 217 for the first, current tax year (e.g., 2011), as well as an option 612 according to embodiments for paying the current year tax 217 and/or estimated tax 217e for a second, future tax year (e.g., 2012). Thus, the taxpayer 215 can pay current year tax due 217 and/or estimated tax 217e without having to pay out of pocket for these taxes 217, 217e.

Referring to FIG. 6B, in response to the taxpayer 215 selecting the "Pay Tax With Refund" option 612 according to embodiments, the tax preparation program 212 generates an interview screen 620 with instructions 621 or notifications regarding the selected option 612 paying tax due 217 to the IRS 245 for the current year with a portion of the refund 216 from the State of California 235 and also the option to pay estimated taxes 217e for the future year with another portion of the State of California refund 216. According to one embodiment, the tax preparation program 212 is configured so that the estimated taxes 217e for future tax years cannot be paid until tax due 217 for the current year is paid in full.

In the illustrated example, the interview screen 620 indicates the refund 216 and tax owed 217 and allows the taxpayer 217 to enter or select in field 623 a portion of the refund amount 216 to be applied to the current Year 2011 Federal Tax due 217. In the illustrated example, the taxpayer 215 has indicated that the entire Federal Tax Due 217 should be paid using the CA Refund 216. The interview screen 620 presents options 624, 626a-c for what should be done with the remaining $657 CA refund 216, e.g., sent to the taxpayer 624 or options 626a-c for applying the refund 216 to estimated tax 217e for a future year (2012).

In the illustrated example, if the remaining refund of $657 is to be applied to future year estimated taxes 217e, the tax preparation program 212 provides options 626a-c allowing the taxpayer 215 to specify how much, if any, of the remaining refund amount 216 should be applied to estimated taxes 217e to a federal tax authority 245, and how much, if any, should be applied to estimated taxes 217e to a state tax authority 235. In the illustrated example, the taxpayer 215 has specified that of that remaining $657 CA Refund, $250 should be used to pay estimated federal taxes 217e for 2012, and another $250 should be used to pay estimated state taxes 217e for 2012.

Referring to FIG. 6C, as a result of applying the CA refund 216 to tax owed 217 and estimated taxes 217e, the interview screen 630 shows the result is a final remaining amount of CA Refund 216 in the amount of $157 available to the taxpayer 215. The taxpayer 215 can choose options 543a-c specifying how the taxpayer 215 should receive the remaining $157 refund, e.g., by direct deposit to account 252 at the taxpayer's FI 250, check by mail, or a refund card.

Thus, according to embodiments, a refund 216 for a current tax year from one tax authority 235 can be applied to tax owed 217 for that current year to one or more other tax authorities 245, and/or that current tax year refund 216 can be applied to an estimated tax 217e payable to one or more other tax authorities 245. Embodiments may also involve estimated taxes 217e paid to the same tax authority. Thus, while part of a current year tax refund 216 is allocated to tax 217 of a current year owed to another tax authority 245, estimated taxes 217 can be paid to the same or different tax authority.

For example, the tax preparation program 212 or refund transfer program 221 can use a current year (e.g., 2011) refund 216 from a state tax authority 235 to pay current year (2011) tax due 217 to a federal tax authority 245 as well as future year (e.g., 2012) estimated tax 217e to the federal tax authority 245. As another example, the tax preparation program 212 or refund transfer program 221 can use a current year (e.g., 2011) refund 216 from a federal tax authority 245 to pay current year (2011) tax due 217 to a state tax authority 235 as well as future year (e.g., 2012) estimated tax 217e to the state tax authority 235. Thus, current taxes 217 owed and estimated taxes 217e can be paid to the same tax authority, whereas the refund 216 used for these payments is from a different tax authority.

As another example, the tax preparation program 212 or refund transfer program 221 can use a current year (e.g., 2011) refunds 216 from multiple tax authorities to pay estimated taxes 217e for a future year (e.g., 2012) to a single tax authority. According to one embodiment, the tax preparation program 212 or refund transfer program 221 can use both current year (2011) state and federal refunds 216 to pay future year estimated taxes 217e to only the federal tax authority 245, to only the state tax authority 235.

Yet other embodiments involve the tax preparation program 212 or refund transfer program 221 using a current year (e.g., 2011) refund 216 from a tax authority to pay current year (e.g., 2011) tax owed 217 and future year (2012) estimated taxes 217e to multiple tax authorities. For example, the tax preparation program 212 or refund transfer program 221 can use a current year (2011) refund 216 from a state tax authority 235 to pay current year taxes 217 for year 2011 to a federal tax authority 245 as well as future year (2012) estimated taxes 217e to a state tax authority 235. As another example, the tax preparation program 212 or refund transfer program 221 can use a current year (2011) refund 216 from a state tax authority 235 to pay current year taxes (2011) to the state tax authority 235 as well as future year (2012) estimated taxes 217e to a federal tax authority 245. As another example, the tax preparation program 212 or refund transfer program 221 may a current year (2011) refund 216 from a federal tax authority 245 to pay current year taxes 217 (2011) to a state tax authority 235 as well as future year (2012) estimated taxes 217e to a federal tax authority 245, and the tax preparation program 212 or refund transfer program 221 can use a current year (2011) refund 216 from a federal tax authority 245 to pay current year taxes 217 (2011) to the federal tax authority 245 as well as future year (2012) estimated taxes 217e to a state tax authority 235.

Accordingly, it will be understood that embodiments may allow current year and/or estimated tax payments to be made without the taxpayer having to pay those taxes out of pocket. Moreover, while the taxpayer may provide instructions for using a refund to make a tax payment according to embodiments, the taxpayer never actually receives the refund from the first tax authority to make current year and/or estimated taxes since the refund is instead managed at a different level by the intermediate computer in communication with and between different tax authorities. Thus, in refund/tax payment processing methods of embodiments, the intermediate computer executes payment of current tax owed and/or estimated tax without sending that refund or refund portion to the taxpayer, and with embodiments, the taxpayer never actually receives or possesses that refund portion applied by the intermediate computer as a current or estimated tax payment and thus the taxpayer does not withdraw funds from an account the taxpayer has at a financial institution for these tax payments.

Figure 7:
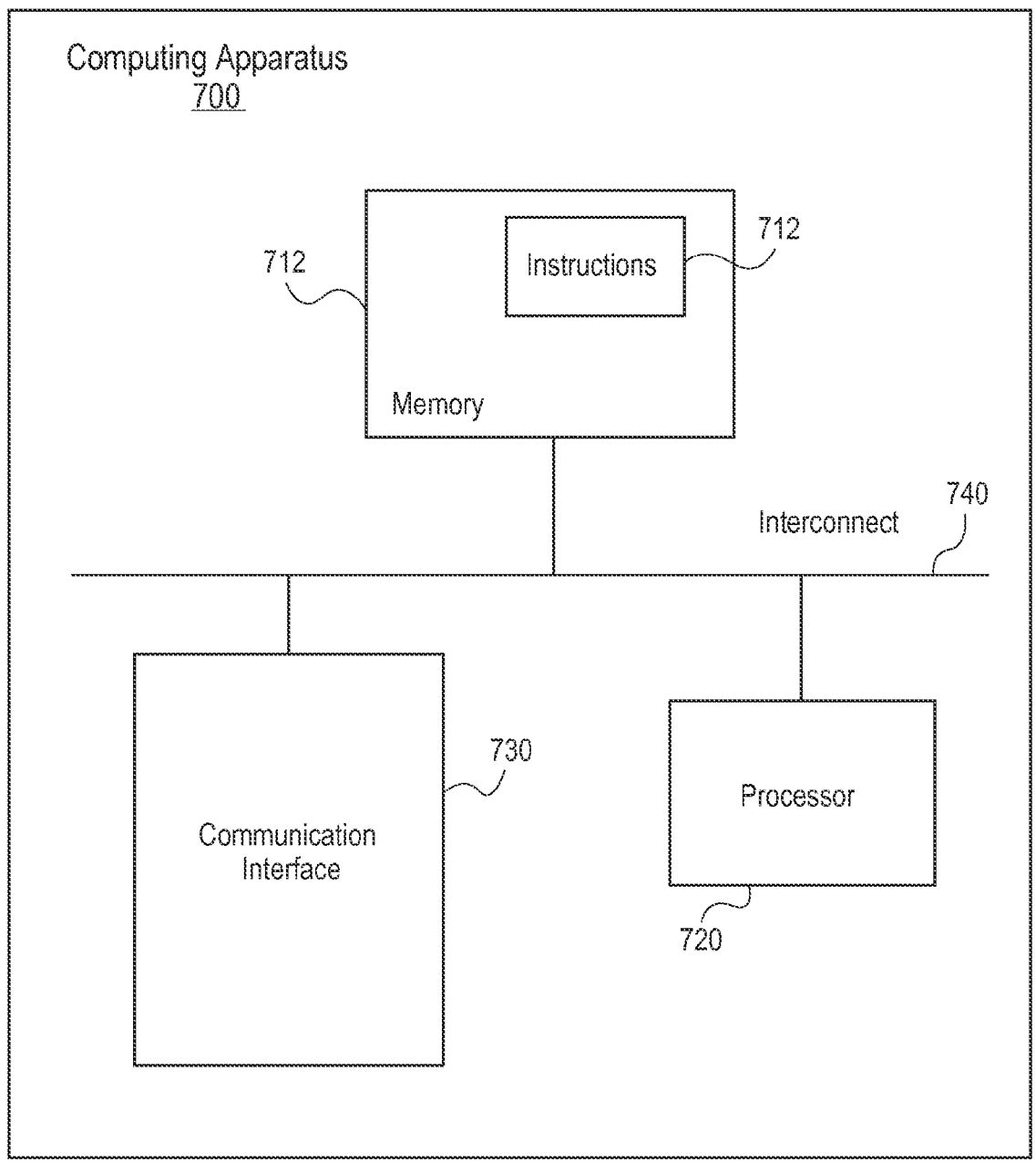
FIG. 7 is a system diagram of components of a computing apparatus that may be utilized by various system components.

FIG. 7 generally illustrates computing components that may be included in various system components to implement embodiments. A computing apparatus 700 may include a memory 710, program instructions 712, a processor or controller 720, a network or communications interface 730, and connections or interconnect 740 between such components. For example, the memory 710 may be or include one or more of cache, RAM, ROM, SRAM, DRAM, RDRAM, EEPROM and other types of memory. The processor unit 720 may be or include multiple processors, a single threaded processor, a multi-threaded processor, a multi-core processor, or other type of processor. Depending on the particular system component (e.g., whether the component is a computer or a hand held mobile communications device), the interconnect 740 may include a system bus, LDT, PCI, ISA, or other types of buses, and the communications or network interface may, for example, be an ethernet interface, a Frame Relay interface, or other interface. The network interface 730 may be configured to enable a system component to communicate with other system components across a network which, as explained above, may be a wireless or various other networks. Accordingly, the system configuration provided in FIG. 7 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 720 performs steps or executes program instructions 712 within memory 710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Various changes and modifications may be made without departing from the scope of the claims.

For example, although certain embodiments are described with reference to individual tax returns, embodiments can also be applied to preparation of business or corporate tax returns, for income and other types of taxes.

Further, embodiments may involve using refunds from one or multiple tax authorities, for payment of current tax owed and/or estimated tax to be paid to one or multiple tax authorities. Thus, a refund from one tax authority may be used for tax payments to one different tax authority for current year and/or estimated taxes, or to multiple tax authorities, at least one of which is different than the tax authority from which the refund is received, to pay current and/or estimated taxes.

Additionally, embodiments may involve refund and tax due amounts determined from electronic tax returns and/or from mailed or paper returns using a recognition process such as OCR as necessary.

Embodiments may also be applied such that the intermediate computer utilizes the refund for payment of another debit or loan. For example, the taxpayer, through the tax preparation program, may specify that the refund or portion thereof should be applied as payment to a mortgage, automobile loan, education loan, credit card bill, etc. The loan or credit card particulars can be entered into an interview screen of the tax preparation program. Thus, payments can be made to the loan or credit card without the taxpayer ever receiving or possessing the refund utilized for the payment.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

For example, the tax preparation program can present options for how a refund from one tax authority should be used to pay tax owed to another tax authority before or after the electronic tax returns have been filed. Moreover, instructions for inter-authority transfer can be submitted after tax returns have been filed, e.g., after tax return filing and after the intermediate computer confirms or receives confirmation of refund and tax due amounts, or after tax return filings and before a refund has been sent by a tax authority to a taxpayer.

Accordingly, embodiments are intended to exemplify alternatives, modifications, and equivalents that may fall within the scope of the claims.

What is claimed is:

1. A computer-implemented tax payment method, the method being performed by an intermediate computer in communication with a computer of a first tax authority and a computer of a second tax authority, the method comprising:

the intermediate computer preparing respective first and second electronic tax returns of a taxpayer for respective first and second tax authorities by execution of a tax preparation application and accessing respective first and second electronic tax returns to determine an amount of tax owed by the taxpayer to the first tax authority and an amount of a tax refund owed by the second tax authority to the taxpayer;

the intermediate computer receiving an instruction by the taxpayer indicating how to apply the tax refund owed by the second tax authority to pay the tax owed to the first tax authority;

the intermediate computer electronically filing respective first and second electronic tax returns with respective first and second tax authorities;

the intermediate computer receiving, from respective computers of respective first and second tax authorities, confirmation of the amount owed to the first tax authority and the amount of the refund owed by the second tax authority; and the intermediate computer executing the instruction for an inter tax authority transfer through the intermediate computer by withdrawing or receiving the refund from the computer of the second tax authority and applying the tax refund as an electronic payment of the tax owed to the computer of the first tax authority.

2. The method of claim 1, the tax being paid to the first tax authority on behalf of the taxpayer without depositing the tax refund into an account of the taxpayer at a financial institution.

3. The method of claim 1, the tax being paid to the first tax authority on behalf of the taxpayer without the taxpayer drawing upon an account the taxpayer has at a financial institution.

4. The method of claim 3, the account comprising a checking account, the tax being paid without the taxpayer writing a check or making an electronic payment from the checking account to the first tax authority.

5. The method of claim 3, the account comprising a credit card account, the tax being paid without the taxpayer paying the first tax authority utilizing the credit card.

6. The method of claim 1, the tax comprising an income tax.

7. The method of claim 1, the first tax authority comprising one of a federal tax authority and a state tax authority, and the second tax authority comprising another one of the federal tax authority and the state tax authority.

8. The method of claim 1, the first tax authority comprising a first state tax authority, and the second tax authority comprising a second state tax authority.

9. The method of claim 1, at least one of the first tax authority and the second tax authority being a local tax authority.

10. The method of claim 1, further comprising the intermediate computer confirming receipt of funds of the tax refund from the second tax authority, the intermediate computer executing the electronic payment to the first tax authority after confirming receipt of funds of the tax refund.

11. The method of claim 1, further comprising the intermediate computer transmitting to the taxpayer a confirmation of the tax payment to the first tax authority with the tax refund received from the second tax authority.

12. The method of claim 1, the tax refund being applied to pay all tax owed by the taxpayer to the first tax authority.

13. The method of claim 1, the tax refund being applied to pay a portion of the tax owed by the taxpayer to the first tax authority.

14. The method of claim 13, the intermediate computer receiving the instruction comprising the intermediate computer receiving an input by the tax payer through the tax preparation application indicating an amount of the tax refund to be utilized for the payment of the tax owed by the taxpayer to the first tax authority.

15. The method of claim 14, the input being received through an interview screen generated by the tax preparation application utilized by the taxpayer to prepare respective electronic tax returns for respective first and second tax authorities.

16. The method of claim 1, wherein the amount of tax owed is greater than the amount of the tax refund such that a first portion of the tax owed is paid with the tax refund, and a second remaining portion of the tax is owed by the taxpayer to the first tax authority.

17. The method of claim 1, wherein the amount of the tax refund is greater than the amount of the tax owed such that a first portion of the tax refund is utilized to pay the tax owed to the first tax authority, and the second tax authority owes the taxpayer a remaining second portion of the tax refund after the electronic payment.

18. The method of claim 17, further comprising the intermediate computer electronically depositing the second remaining portion of the tax refund to a designated account of the taxpayer at a financial institution.

19. The method of claim 1, the intermediate computer executing payment of the tax owed to the first tax authority with the tax refund without the taxpayer withdrawing funds from an account the taxpayer has at a financial institution.

20. The method of claim 1, wherein the taxpayer is never in possession of funds utilized to pay the tax owed.

21. The method of claim 1, the intermediate computer receiving the instruction by the taxpayer indicating how to apply the tax refund owed by the second tax authority to pay the tax owed to the first tax authority before respective first and second electronic tax returns are filed with respective first and second tax authorities.

22. The method of claim 1, the intermediate computer receiving the instruction by the taxpayer indicating how to apply the tax refund owed by the second tax authority to pay the tax owed to the first tax authority after respective first and second electronic tax returns are filed with respective first and second tax authorities.

23. The method of claim 22, the intermediate computer receiving the instruction after the first and second tax returns have been filed but before the second tax authority has sent the refund to the taxpayer.

24. The method of claim 22, the intermediate computer receiving the instruction after the first and second tax returns have been filed and after the intermediate computer receives respective confirmation of respective amounts of the refund and tax owed from respective computers of respective first and second tax authorities.

* * * * *